US008955768B1

(12) United States Patent
Clark et al.

(10) Patent No.: US 8,955,768 B1
(45) Date of Patent: *Feb. 17, 2015

(54) REVERSING MECHANISM FOR AN IRRIGATION SPRINKLER WITH A REVERSING GEAR DRIVE

(71) Applicant: Hunter Industries, Inc., San Marcos, CA (US)

(72) Inventors: Michael L. Clark, San Marcos, CA (US); Zachary B. Simmons, Escondido, CA (US)

(73) Assignee: Hunter Industries, Inc., San Marcos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/925,578

(22) Filed: Jun. 24, 2013

Related U.S. Application Data

(63) Continuation-in-part of application No. 12/710,265, filed on Feb. 22, 2010, now Pat. No. 8,469,288, which is a continuation-in-part of application No. 11/761,911, filed on Jun. 12, 2007, now Pat. No. 7,677,469, application No. 13/925,578, which is a continuation-in-part of application No. 12/710,298, filed on Feb. 22, 2010, now Pat. No. 8,474,733.

(51) Int. Cl.
*B05B 3/16* (2006.01)
*B05B 3/04* (2006.01)

(52) U.S. Cl.
CPC .................. *B05B 3/0431* (2013.01)
USPC ............ 239/242; 239/203; 239/237; 239/240

(58) Field of Classification Search
USPC ......... 239/203–206, 237, 240, 241, 242, 263, 239/264
See application file for complete search history.

(56) References Cited

U.S. PATENT DOCUMENTS

| 4,204,642 A | 5/1980 | Hunter |
| 4,265,404 A | 5/1981 | Hunter |
| 4,301,967 A | 11/1981 | Hunter |
| 4,501,391 A | 2/1985 | Hunter |
| 4,568,023 A | 2/1986 | Hayes |
| RE32,386 E | 3/1987 | Hunter |
| 4,784,329 A | 11/1988 | Heren |
| 4,892,252 A | 1/1990 | Bruninga |
| 5,058,806 A | 10/1991 | Rupar |
| 5,174,501 A | 12/1992 | Hadar |
| 5,288,022 A | 2/1994 | Sesser |
| 5,330,103 A | 7/1994 | Eckstein |
| 5,375,768 A | 12/1994 | Clark |
| 5,423,486 A | 6/1995 | Hunter |

(Continued)

OTHER PUBLICATIONS

Rain Bird 7005 Full/Part-Circle Rotor Pop-Up Sprinkler—Rain Bird 2005-2006 Catalog, p. 88.

(Continued)

*Primary Examiner* — Steven J Ganey
(74) *Attorney, Agent, or Firm* — Knobbe Martens Olson & Bear LLP

(57) ABSTRACT

A sprinkler can include a turbine, a nozzle, a gear drive and a reversing mechanism. The gear drive and the reversing mechanism rotatably couple the turbine and the nozzle. The gear drive can shift a direction of rotation of an output stage that is coupled to the reversing mechanism. The reversing mechanism can include a shift member coupled with the gear drive.

19 Claims, 16 Drawing Sheets

(56) References Cited

U.S. PATENT DOCUMENTS

| | | | |
|---|---|---|---|
| 5,456,411 A | 10/1995 | Scott et al. | |
| 5,511,727 A | 4/1996 | Heren et al. | |
| 5,556,036 A | 9/1996 | Chase | |
| 5,645,218 A | 7/1997 | Heren et al. | |
| 5,662,545 A | 9/1997 | Zimmerman et al. | |
| 5,685,486 A * | 11/1997 | Spenser | 239/242 |
| 5,699,962 A | 12/1997 | Scott et al. | |
| 5,711,486 A | 1/1998 | Clark et al. | |
| 5,720,435 A | 2/1998 | Hunter | |
| 5,762,270 A | 6/1998 | Kearby et al. | |
| 5,918,812 A | 7/1999 | Beutler | |
| 5,927,607 A | 7/1999 | Scott | |
| 5,938,122 A | 8/1999 | Heren et al. | |
| 5,988,523 A | 11/1999 | Scott | |
| 6,042,021 A | 3/2000 | Clark | |
| 6,050,502 A | 4/2000 | Clark | |
| 6,082,632 A | 7/2000 | Clark et al. | |
| 6,123,271 A | 9/2000 | Delaney | |
| 6,138,924 A | 10/2000 | Hunter et al. | |
| 6,227,455 B1 | 5/2001 | Scott et al. | |
| 6,241,158 B1 | 6/2001 | Clark et al. | |
| 6,244,521 B1 | 6/2001 | Sesser | |
| 6,299,075 B1 | 10/2001 | Koller | |
| 6,457,656 B1 | 10/2002 | Scott | |
| 6,491,235 B1 | 12/2002 | Scott et al. | |
| 6,499,672 B1 | 12/2002 | Sesser | |
| 6,604,697 B1 | 8/2003 | Heren et al. | |
| 6,651,905 B2 | 11/2003 | Sesser et al. | |
| 6,688,539 B2 | 2/2004 | Vander Griend | |
| 6,695,223 B2 | 2/2004 | Beutler et al. | |
| 6,732,950 B2 | 5/2004 | Ingham, Jr. et al. | |
| 6,736,332 B2 | 5/2004 | Sesser et al. | |
| 6,817,543 B2 | 11/2004 | Clark | |
| 6,854,664 B2 | 2/2005 | Smith | |
| 6,871,795 B2 | 3/2005 | Anuskiewicz | |
| 6,957,782 B2 | 10/2005 | Clark et al. | |
| 7,017,831 B2 | 3/2006 | Santiago et al. | |
| 7,028,920 B2 | 4/2006 | Hekman et al. | |
| 7,032,836 B2 | 4/2006 | Sesser et al. | |
| 7,040,553 B2 | 5/2006 | Clark | |
| 7,156,322 B1 * | 1/2007 | Heitzman | 239/240 |
| 7,159,795 B2 | 1/2007 | Sesser et al. | |
| 7,240,860 B2 | 7/2007 | Vander Griend | |
| 7,287,711 B2 | 10/2007 | Crooks | |
| 7,303,147 B1 | 12/2007 | Danner et al. | |
| 7,322,533 B2 | 1/2008 | Grizzle | |
| D593,182 S | 5/2009 | Anuskiewicz | |
| 7,530,504 B1 | 5/2009 | Danner et al. | |
| 7,611,077 B2 | 11/2009 | Sesser et al. | |
| 7,621,467 B1 | 11/2009 | Garcia | |
| 7,677,469 B1 | 3/2010 | Clark | |
| 7,748,646 B2 | 7/2010 | Clark | |
| 7,828,230 B1 | 11/2010 | Anuskiewicz et al. | |
| 7,861,948 B1 | 1/2011 | Crooks | |
| 8,220,723 B2 | 7/2012 | Clark | |
| 8,272,578 B1 | 9/2012 | Clark et al. | |
| 8,282,022 B2 | 10/2012 | Porter | |
| 8,297,533 B2 | 10/2012 | Dunn et al. | |
| 8,313,043 B1 | 11/2012 | Crooks et al. | |
| 8,413,681 B2 | 4/2013 | Schmuckle | |
| 8,430,376 B1 | 4/2013 | Danner et al. | |
| 8,469,288 B1 * | 6/2013 | Clark et al. | 239/242 |
| 2005/0133619 A1 | 6/2005 | Clark | |
| 2006/0049275 A1 | 3/2006 | Santiago et al. | |
| 2009/0224070 A1 | 9/2009 | Clark et al. | |
| 2011/0024522 A1 | 2/2011 | Anuskiewicz | |
| 2012/0024982 A1 | 2/2012 | Dunn et al. | |
| 2012/0043398 A1 | 2/2012 | Clark | |
| 2012/0132727 A1 | 5/2012 | Dunn et al. | |
| 2012/0234940 A1 | 9/2012 | Clark | |
| 2012/0273593 A1 | 11/2012 | Clark | |
| 2013/0074400 A1 | 3/2013 | Roess et al. | |
| 2013/0075490 A1 | 3/2013 | Roess et al. | |

OTHER PUBLICATIONS

Toro 2001 Series Commercial including Data & Performance Charts, pp. 58-59.

Nelson Pro 7000, 7500 & Nelson Pro 5500, 6000, 6500 Data Sheets, pp. 36-37.

* cited by examiner

REVERSING MECHANISM FOR AN IRRIGATION SPRINKLER WITH A REVERSING GEAR DRIVE

CROSS-REFERENCE TO RELATED APPLICATION

This application is a continuation-in-part of U.S. patent application Ser. No. 12/710,265, filed Feb. 22, 2010, now U.S. Pat. No. 8,469,288, which is a continuation-in-part of U.S. patent application Ser. No. 11/761,911 filed Jun. 12, 2007, now U.S. Pat. No. 7,677,469. This application is also a continuation-in-part of U.S. patent application Ser. No. 12/710,298, filed Feb. 22, 2010, now U.S. Pat. No. 8,474,733. The entire contents of the above applications are hereby incorporated by reference and made a part of this specification. Any and all priority claims identified in the Application Data Sheet, or any correction thereto, are hereby incorporated by reference under 37 CFR 1.57.

FIELD OF THE INVENTION

The present invention relates to apparatus for irrigating turf and landscaping, and more particularly, to rotor-type sprinklers having a turbine that rotates a nozzle through a gear train reduction.

BACKGROUND OF THE INVENTION

In many parts of the United States, rainfall is insufficient and/or too irregular to keep turf and landscaping green and therefore irrigation systems are installed. Such systems typically include a plurality of underground pipes connected to sprinklers and valves, the latter being controlled by an electronic irrigation controller. One of the most popular types of sprinklers is a pop-up rotor-type sprinkler. In this type of sprinkler a tubular riser is normally retracted into an outer cylindrical case by a coil spring. The case is buried in the ground and when pressurized water is fed to the sprinkler the riser extends. A turbine and a gear train reduction are mounted in the riser for rotating a nozzle turret at the top of the riser. The gear train reduction is often encased in its own housing and is often referred to as a gear box. A reversing mechanism is also normally mounted in the riser along with an arc adjustment mechanism.

The gear drive of a rotor-type sprinkler can include a series of staggered gears and shafts wherein a small gear on the top of the turbine shaft drives a large gear on the lower end of an adjacent second shaft. Another small gear on the top of the second shaft drives a large gear on the lower end of a third shaft, and so on. Alternately, the gear drive can comprise a planetary arrangement in which a central shaft carries a sun gear that simultaneously drives several planetary gears on rotating circular partitions or stages that transmit reduced speed rotary motion to a succession of similar rotating stages. It is common for the planetary gears of the stages to engage corresponding ring gears formed on the inner surface of the housing. See, for example, U.S. Pat. No. 5,662,545 granted to Zimmerman et al.

Two basic types of reversing mechanisms have been employed in commercial rotor-type sprinklers. In one design a reversing stator switches water jets that alternately drive the turbine from opposite sides to reverse the rotation of the turbine and the gear drive. See for example, U.S. Pat. No. 4,625,914 granted to Sexton et al. The reversing stator design typically employs a long metal shaft that can twist relative to components rigidly mounted on the shaft and undesirably change the reverse point. Stopping the rotation of the stator and changing direction of rotation via alternate water jets does not provide for good repeatable arc shift points. Users setting the arc of sprinklers that employ a reversing stator design do not get a tactile feel for a stop at the set reverse points.

A more popular design for the reversing mechanism of a rotor-type sprinkler includes four pinion gears meshed together and mounted between arc-shaped upper and lower frames that rock back and forth with the aid of Omega-shaped over-center springs. One of the inner pinion gears is driven by the gear drive and the pinion gears on opposite ends of the frames alternately engage a bull gear assembly. See for example, U.S. Pat. Nos. 3,107,056; 4,568,024; 4,624,412; 4,718,605; and 4,948,052, all granted to Edwin J. Hunter, the founder of Hunter Industries, Inc., the assignee of the subject application. The entire disclosures of said patents are hereby incorporated by reference. While the reversing frame design has been enormously successful, it is not without its own shortcomings. It involves a complicated assembly with many parts and can have operational failures. The main drawback of the reversing frame design is that the pinion gears are held in contact to the outer bull gear with a spring force that is relatively weak. Therefore, it is not uncommon for the pinion gears to break, wear out, or become stripped during operation of this kind of rotor-type sprinkler.

Non-reversing, full circle rotation sprinklers such as golf rotors and stream sprinklers have been commercialized that have incorporated planetary gear boxes. Rotor-type sprinklers have also been commercialized that have combined planetary gear boxes and reversing mechanisms, however, in all such sprinklers all parts of the reversing mechanisms have been external to the gear box. See for example, U.S. Pat. No. 4,892,252 granted to Bruniga.

SUMMARY OF THE INVENTION

According some embodiments, a sprinkler can include a turbine, a nozzle, a gear drive and a reversing mechanism. The gear drive and reversing mechanism can rotatably couple the turbine and the nozzle. The gear drive and reversing mechanism can be coupled to shift a direction of rotation of an output stage of the gear drive. In some embodiments, the gear drive can include a control shaft that is axially movable to shift a direction of rotation of an output stage that is coupled to the reversing mechanism. The reversing mechanism can include a shift member secured to an upper end of the control shaft. The reversing mechanism can further include a pivotable shift fork with a first cam and a second cam spaced from the first cam. The first cam can be configured to engage the shift member and raise the control shaft when the shift fork is pivoted to engage the first cam with the shift member. The second cam can be configured to engage the shift member and lower the control shaft when the shift fork is pivoted to engage the second cam with the shift member.

BRIEF DESCRIPTION OF THE DRAWINGS

In FIG. 8 the crank is rotated one-hundred eighty degrees from its orientation illustrated in FIG. 5.

DETAILED DESCRIPTION OF THE PREFERRED EMBODIMENT

According to the present disclosure, a rotor-type sprinkler can include an outer case with a top portion and a bottom portion. A valve can be incorporated in the outer case (e.g., near the bottom of the outer case). The valve can selectively permit ingress of water into the rotor-type sprinkler. The rotor-type sprinkler can include a turbine configured to rotate in response to the ingress of water. A nozzle of the rotor-type sprinkler can be configured to rotate in response to rotation of the turbine. A gear drive can be positioned within the outer case to provide gear reduction between the turbine and the nozzle. In some embodiments, the gear drive is a reversing gear drive configured to selectively reverse the rotation of the nozzle. The rotor-type sprinkler can also include a reversing mechanism configured to reverse the rotation of an output stage of the gear drive. The reversing mechanism can be located externally of the reversing gear drive.

Figure 19:
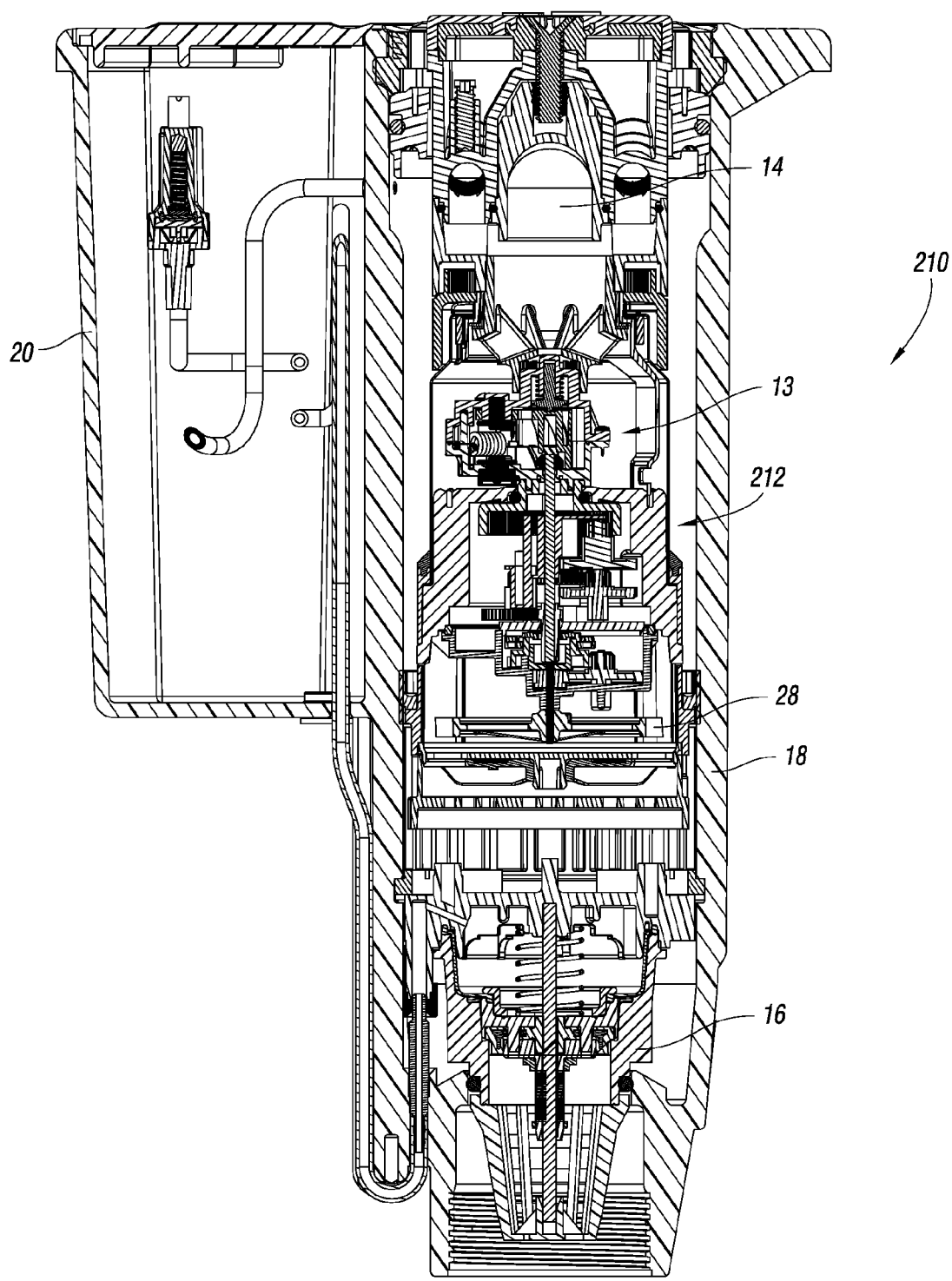
FIG. 19 is a vertical sectional view of a rotor-type sprinkler incorporating another embodiment of the present invention.

In some embodiments, a reversing mechanism can be operatively connected to one or more gears in a reversing gear drive. The reversing mechanism can transition the one or more gears between a plurality of operating positions/configurations to affect, for example, the rotational direction of the nozzle. The reversing gear drive can have any number of different configurations, a few examples of which are described below. For example, the reversing gear drive can be a reversing planetary gear drive 12 (FIG. 2) or a reversing spur gear drive 212 (FIG. 19). Other drive systems can also be used.

As illustrated and described below, the reversing gear drive can include a shifting gear. The shifting gear can be configured to move in an axial direction (e.g., substantially parallel to the axis of rotation of the turbine) between two or more operative positions. For example, the shifting gear can be configured to transition between an upper operative position and a lower operative position. The shifting gear can engage with an upper gear set when in the upper operative position. The upper gear set can be configured to rotate the nozzle in a first direction in response to rotational input from the shifting gear/turbine. The shifting gear can engage with a lower gear set when in the lower operative position. The lower gear set can be configured to rotate the nozzle in a second direction (opposite the first direction) in response to rotational input from the shifting gear/turbine. In some embodiments, the upper gear set and lower gear set share one or more gears and/or gear shafts.

Figure 1:
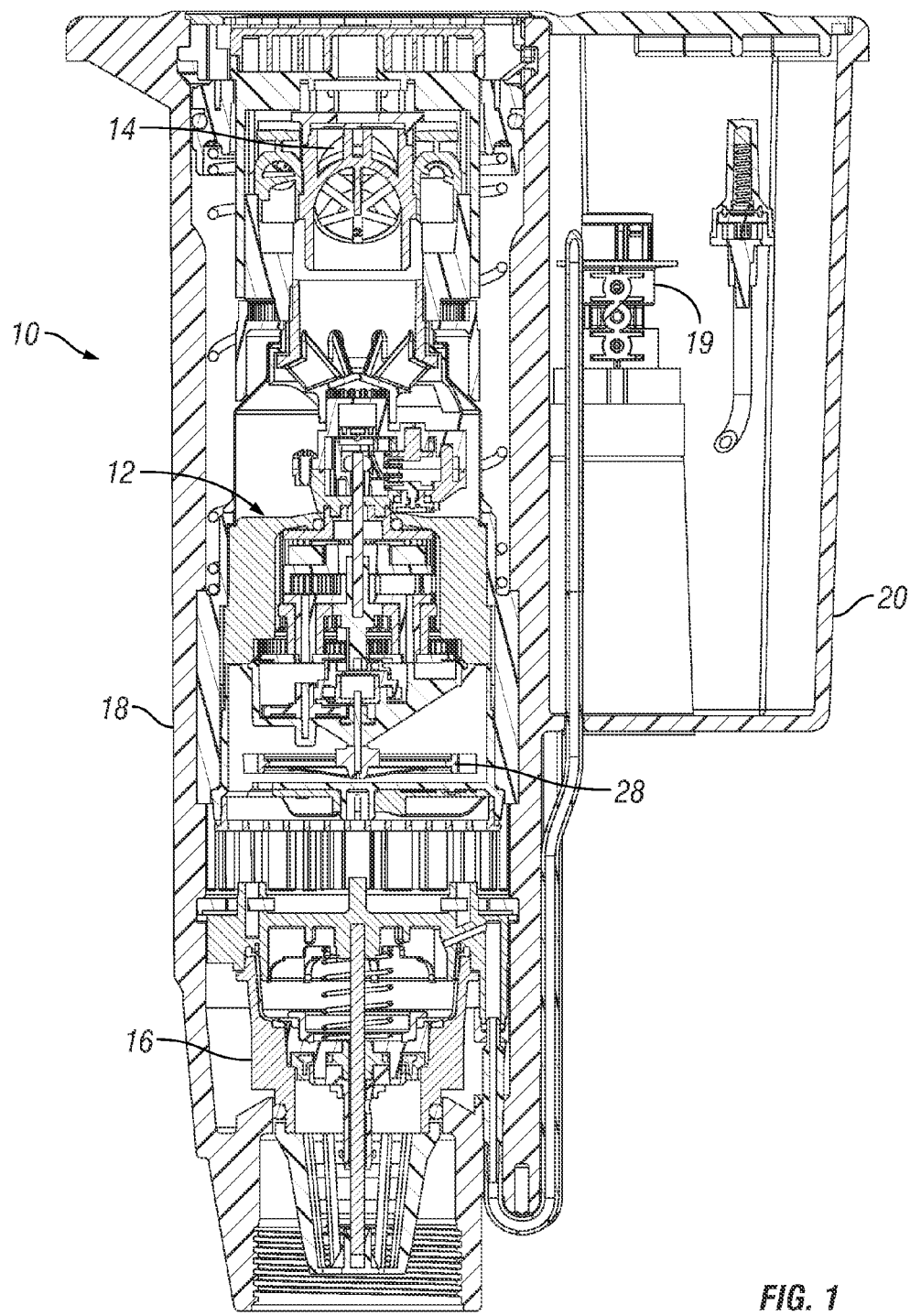
FIG. 1 is a vertical sectional view of a rotor-type sprinkler incorporating an embodiment of the present invention.
Figure 2:
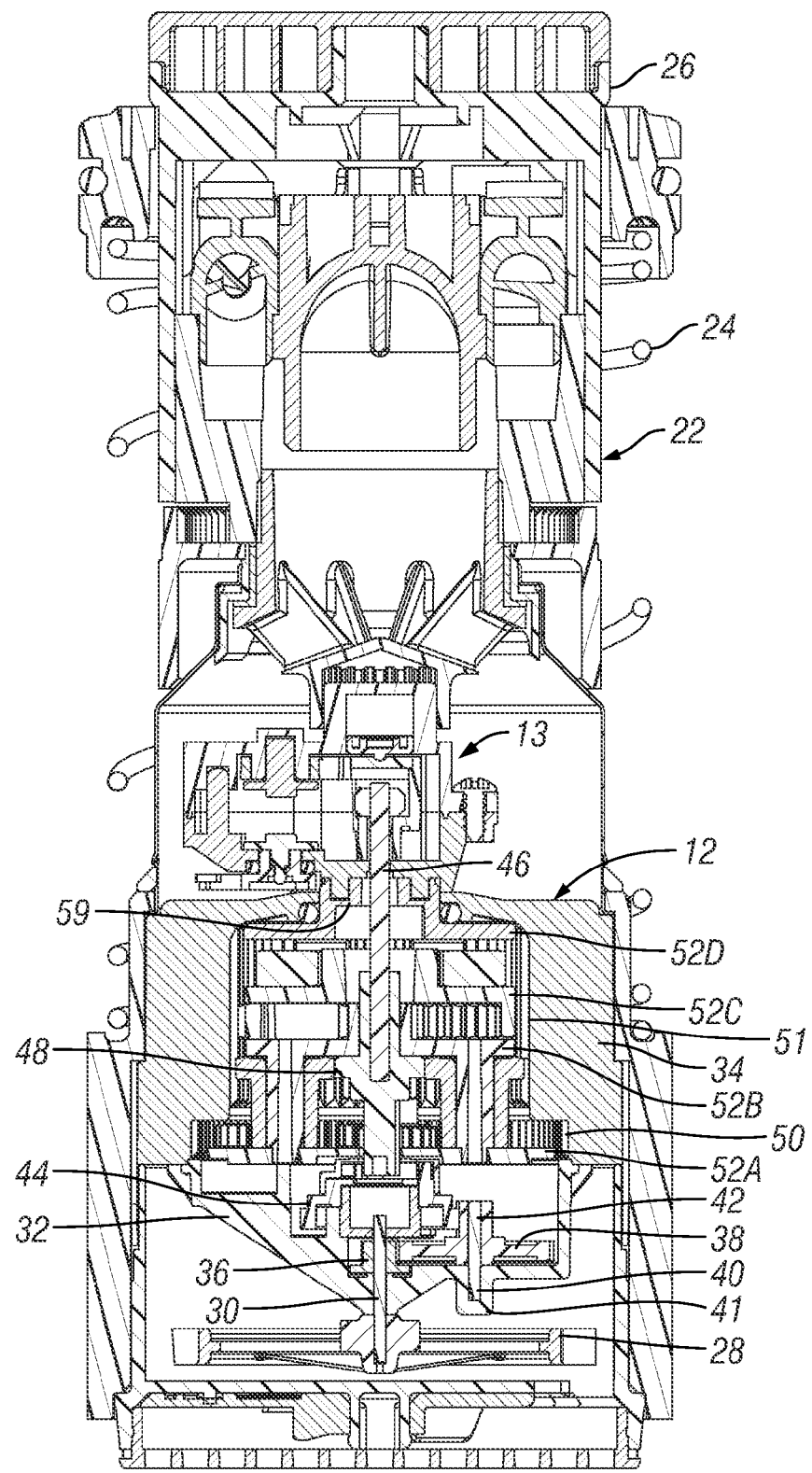
FIG. 2 is an enlarge view of the riser and nozzle turret of the sprinkler of FIG. 1.

Referring to FIG. 1, in accordance with an embodiment of the present invention a rotor-type sprinkler 10 incorporates a reversing planetary gear drive 12 (FIG. 2) that rotates or oscillates a nozzle 14 between pre-set arc limits. Except for the reversing planetary gear drive 12, and an additional reversing mechanism 13 located externally of the reversing planetary gear drive 12, the sprinkler 10 generally has a construction similar to that disclosed in U.S. Pat. No. 6,491,235 of Scott et al. granted Dec. 10, 2002, assigned to Hunter Industries, Inc., the entire disclosure of which is hereby incorporated by reference. Except for the springs, the other components of the sprinkler 10 are generally made of injection molded plastic. The sprinkler 10 is a so-called valve-in-head sprinkler that incorporates a valve 16 in the bottom of a cylindrical outer case 18 which is opened and closed by valve actuator components 19 contained in a housing 20 on the side of the case 18. The sprinkler 10 includes a generally tubular riser 22 (FIG. 2). A coil spring 24 normally holds the riser 22 in a retracted position within the outer case 18. The nozzle 14 is carried inside a cylindrical nozzle turret 26 rotatably mounted to the upper end of the riser 22. The coil spring 24 is compressible to allow the riser 22 and nozzle turret 26 to telescope from their retracted positions to their extended positions when pressurized water is introduced into the female threaded inlet at the lower end of the outer case 18.

FIG. 2 illustrates further details of the riser 22, nozzle turret 26 and reversing planetary gear drive 12. A turbine 28 is rigidly secured to the lower end of a vertically oriented drive input pinion shaft 30. The pinion shaft 30 extends through the lower cap 32 of a cylindrical gear box housing 34 of the reversing planetary gear drive 12. A turbine pinion gear 36 is rigidly secured to the upper end of the pinion shaft 30. The turbine pinion gear 36 drives a lower spur gear 38 secured to a spur gear shaft 40. The lower end of the spur gear shaft 40 is journaled in a sleeve 41 integrally formed in the lower cap 32. Another pinion gear 42 is integrally formed on top of the spur gear 38 and drives an upper spur gear 44 of the reversing planetary gear drive 12. Thus the turbine 28 is coupled to an input stage of the planetary gear drive 12.

Figure 14:
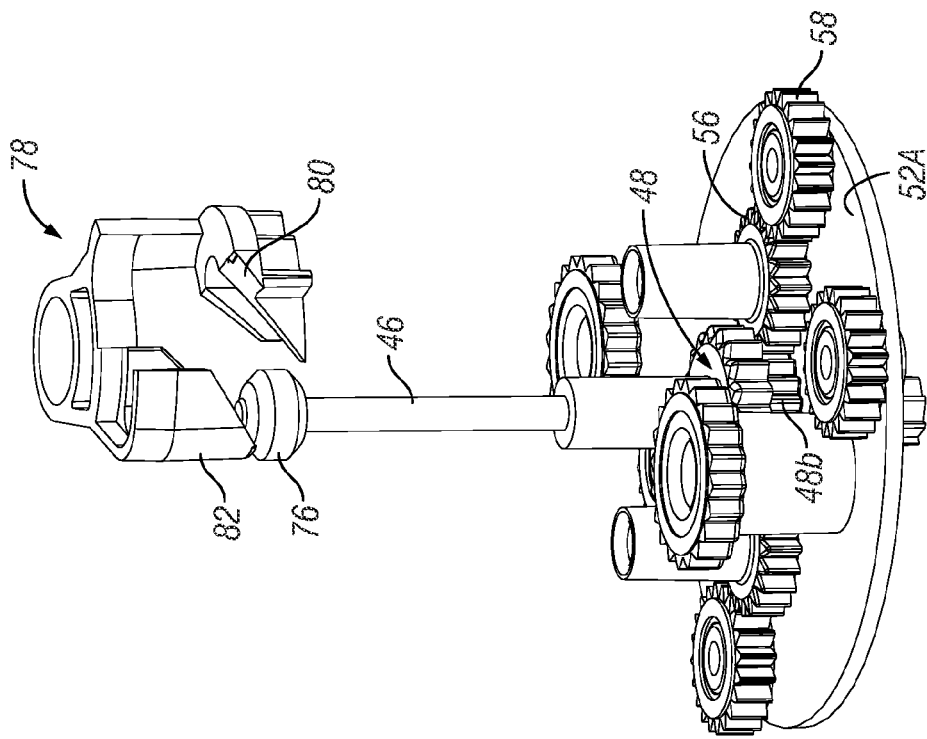
FIGS. 13 and 14 illustrate the raised and lowered positions, respectively, of the bi-level shift sun gear caused when shift fork pivots and the two differently sloped cams of the shift fork engage and axially move the shift member connected to the upper end of the control shaft.
Figure 13:
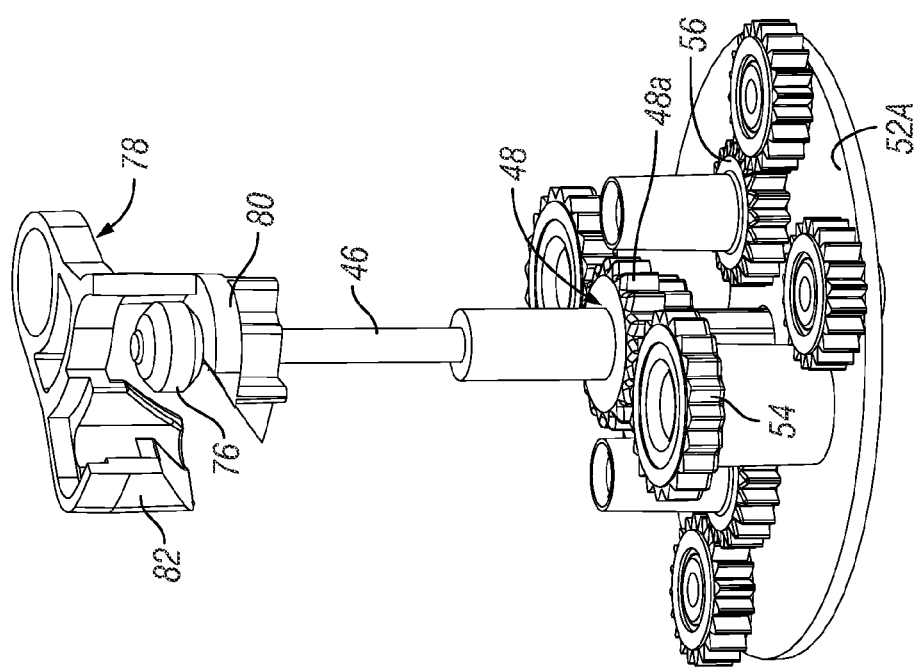

Referring still to FIG. 2, the reversing planetary gear drive 12 has a centrally located main control shaft 46. The lower end of the control shaft 46 is rigidly and co-axially coupled to a bi-level shift sun gear 48 which is vertically reciprocated by axial movement of the control shaft 46 between a raised state illustrated in FIGS. 2 and 13 and a lowered state illustrated in FIG. 14. The interior wall of the cylindrical gear box housing 34 is formed with two axially displaced ring gears 50 and 51. Each of the ring gears 50 and 51 comprises a plurality of circumferentially spaced, vertically extending, radially inwardly projecting teeth that are engaged by the various planet gears of the reversing planetary gear drive 12. The lower ring gear 50 has a larger diameter and more teeth than the upper ring gear 51. The upper ring gear 51 has a larger axial length than the lower ring gear 50. Together the ring gears 50 and 51 form a bi-level ring gear.

Figure 3:
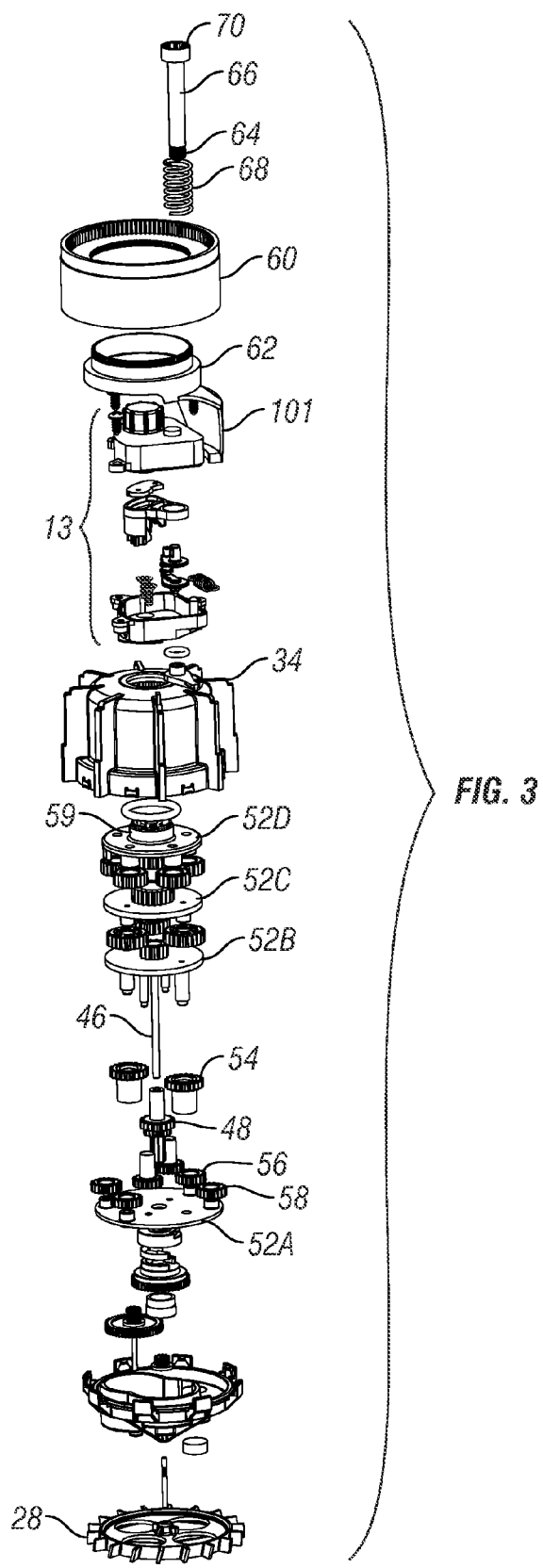
FIG. 3 is an exploded view of the reversing planetary gear drive and additional reversing mechanism of the sprinkler of FIG. 1.

Referring to FIG. 3, the reversing planetary gear drive 12 includes a first disc-shaped stage carrier 52A, a second disc-shaped stage carrier 52B, a third disc-shaped stage carrier 52B, and a fourth disc-shaped stage carrier 52D. The stage carrier 52D functions as an output stage of the planetary gear drive 12. The carriers 52A, 52B, 52C and 52D rotate around the control shaft 46. A central spline opening (not illustrated) in the upper spur gear 44 is drivingly coupled to a spline-shaped extension of the bi-level shift sun gear 48 to allow for axial movement of the bi-level shift gear 48 relative to the upper spur gear 44. Thus the upper spur gear 44 continuously rotates the bi-level shift sun gear 48 and the control shaft 46 during vertical axial reciprocating movement of the control shaft 46 and the bi-level shift sun gear 48.

When the bi-level shift sun gear 48 is in its raised state (FIGS. 2 and 13) the larger diameter upper stage 48a thereof engages and meshes with a complementary planet gear 54. When the bi-level shift sun gear 48 is in its lowered state (FIG. 14) the smaller diameter lower stage 48b thereof engages and meshes with a complementary idler gear 56. The different gear profiles of the upper and lower stages of the bi-level shift sun gear 48 are important in matching the rotational speed of the nozzle 14 in both the clockwise and counter-clockwise directions. The planet gear 54 directly meshes with the upper ring gear 51 (FIG. 2) formed on the interior wall of the gear box housing 34. The idler gear 56 engages another planet gear 58 (FIG. 14) which in turn engages the lower ring gear 50 (FIG. 2). Thus the direction of rotation subsequently carried through the remaining stages of the reversing planetary gear drive 12 is reversed by up and down movement of the control shaft 46 and the bi-level shift sun gear 48 carried therewith.

The bi-level shift sun gear 48 has a neutral position between the planet gear 54 and the idler gear 56 in which it is not engaged with either of these two gears. This precludes any possibility that the bi-level sun gear 48 will strip either or both of the gears 54 and 56. The bi-level shift sun gear 48 always rotates as a result of the upstream rotating gears that are driven by the turbine 28. If the gear teeth of the bi-level shift sun gear 48 do not immediately engage with the gears 54 and 56 during shifting, the teeth will align within one tooth of rotation. The bi-level shift sun gear 48 is spring biased both upwardly and downwardly from this neutral position by an over-center spring mechanism (hereafter described) inside the reversing mechanism 13. This ensures that the planetary gear drive 12 will be in one of two driving states, either rotating the nozzle 14 clockwise or counter-clockwise.

The level of rotational torque on the planet gears 54 and 58 is very low since they rotate at relatively high RPM. The meshing of the bi-level shift sun gear 48 with the planet gear 54 and the idler gear 56 is very smooth. The smooth shifting transition is largely influenced by its vertical position in the planetary gear drive 12. The rotational speed of the turbine 28 is very high. If the shift sun gear 48 is placed too close to the turbine 28, the rotational speed of the bi-level shift sun gear 48 will be too fast, and shifting direction will be difficult as the gear teeth will tend to skip past each other instead of meshing smoothly. Likewise, the final output stage of the reversing planetary gear drive 12 generates substantial rotational torque. If the shift sun gear 48 is placed too close to the output stage (carrier 52D), the excessive torque will make it difficult for the teeth of the shift sun gear 48 to slip axially across the faces of the planet gear 54 and idler gear 56 and shifting will be difficult. Of course the pitch of the gears on the upper and lower stages of the bi-level shift sun gear 48, the idler gear 56 and the planet gears 54 and 58 must match that of the respective ring gears 50 and 51 in order that they mesh properly. However, it is not necessary that the pitch of the teeth on the upper ring gear 51 is the same as those on the lower ring gear 50 as they are completely independent drive sections of the reversing planetary gear drive 12.

The reversing planetary gear drive 12 further includes additional sun gears and planet gears which need not be described in detail as they will be readily understood by those skilled in the art of sprinkler design in view of FIGS. 2 and 3. The other planet gears also engage the ring gears 50 and 51 and rotate about corresponding fixed cylindrical posts that extend vertically from their associated disc-shaped carriers 52A, 52B, 52C and 52D. Each non-shifting sun gear is rigidly secured to, or integrally formed with, one of the carriers 52B, 52C and 52D. The uppermost carrier 52D has an upwardly projecting central section 59 (FIG. 2) that is coupled to the underside of the reversing mechanism 13 in order to rotate the same. The reversing mechanism 13 in turn supports and rotates the nozzle turret 26. With this arrangement of gears the high RPM of the turbine 28 is successively reduced so that the final output RPM of the control shaft 46 is relatively low, and the output torque at the central section 59 of the uppermost carrier 52D is relatively high. For example, the turbine 28 may rotate at eight hundred RPM and the output shaft 46 may rotate at an RPM of less than one.

Thus the sprinkler 10 uses the planetary gear drive 12 and the additional reversing mechanism 13 to change the direction of rotation of the nozzle turret 26. The overall reversing mechanism of the sprinkler 10 has two portions, namely, the components of the reversing mechanism 13 that are located external of the gear box housing 34, and another portion that is contained within the planetary gear drive 12 that includes the bi-level shifting sun gear 48, planetary gear 54, idler gear 56, and planetary gear 58. The advantage of including at least a portion of the overall reversing mechanism in the planetary gear drive 12 is that the shifting can be done in a low torque region of the planetary gear drive 12 where damage and wear to gears is much less likely to occur. This eliminates the need to use conventional arc-shaped shifting frames with delicate pinion gears that engage a bull gear assembly and bear large loads. The planetary gear drive 12 can deliver relatively high rotational torque to the nozzle turret 26 in a manner that is useful in large rotor-type sprinklers used to water large areas such as golf courses and playing fields. Such high torque may prematurely wear out and/or strip conventional pivoting gear train reversing mechanisms. The different gear tooth profiles of the ring gears 50 and 51 and the upper and lower stages of the bi-level shift sun gear 48 desirably result in the nozzle 14 rotating in both the clockwise and counter-clockwise directions at a substantially uniform predetermined speed of rotation.

High output torque is important for large area sprinklers. Sprinklers of this type can discharge seventy-five gallons of water per minute at one-hundred and twenty PSI throwing water one hundred and fifteen feet from the sprinkler. Discharging water at this high rate creates substantial upward and radial forces on the nozzle turret 26 that results in significant drag and resistance to rotation of this key component of a rotor-type sprinkler. The gear drives utilized in this type of sprinkler must overcome this resistance. Additional details regarding the reversing planetary gear drive 12 are disclosed in U.S. Pat. No. 8,474,733, entitled IRRIGATION SPRINKLER WITH REVERSING PLANETARY GEAR INCLUDING TWO RING GEARS WITH DIFFERENT PROFILES, the entire disclosure of which is hereby incorporated by reference.

Figure 4:
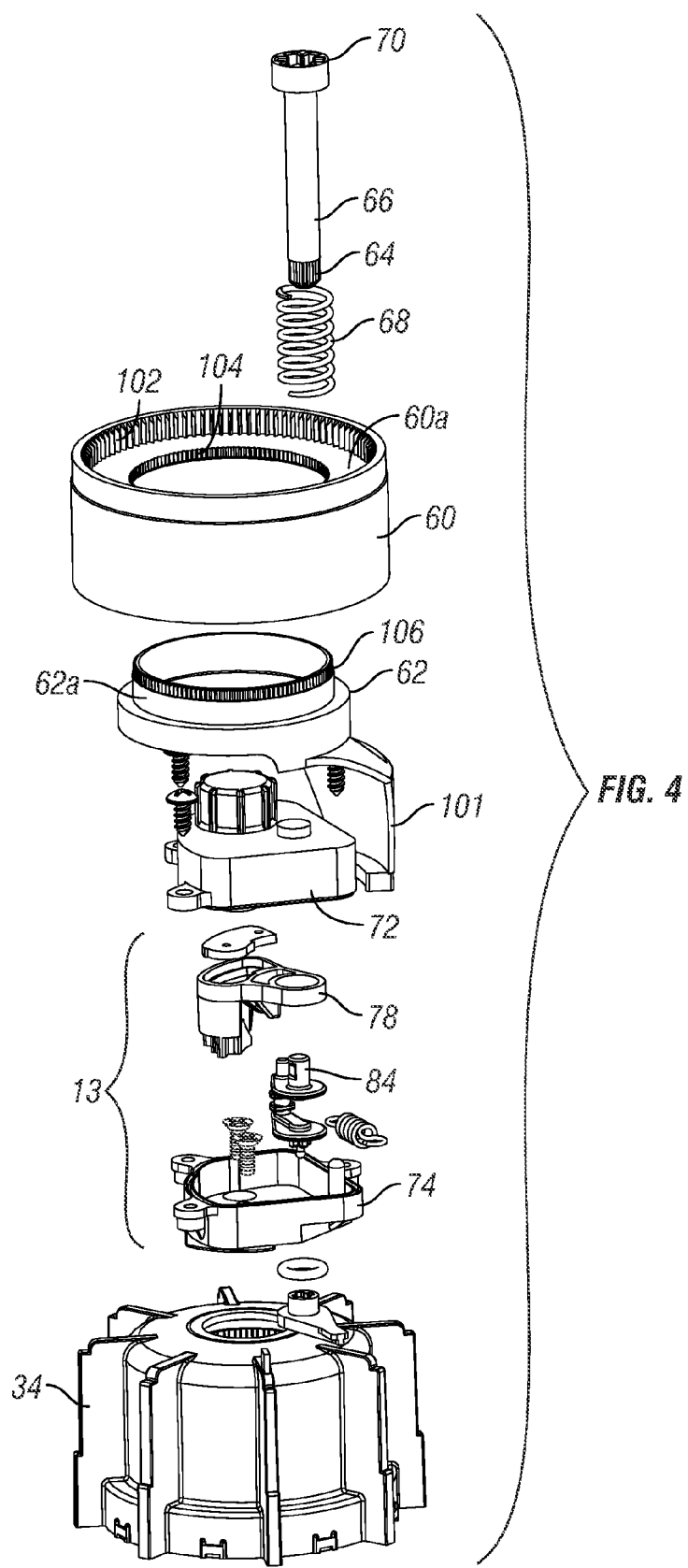
FIG. 4 is an enlarged portion of FIG. 3 illustrating further details of the additional reversing mechanism, bull gear ring, carrier ring and adjusting gear of the sprinkler of FIG. 1.
Figure 8:
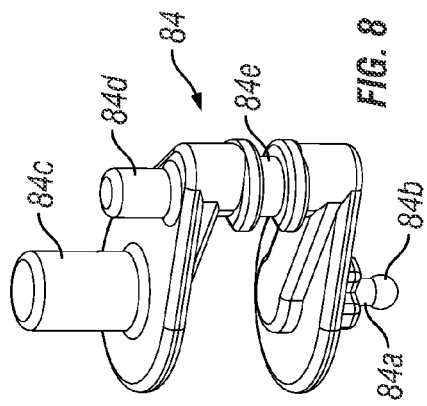
FIG. 8 is an enlarged isometric view of the shift crank of the reversing mechanism illustrated in FIG. 5.
Figure 12:
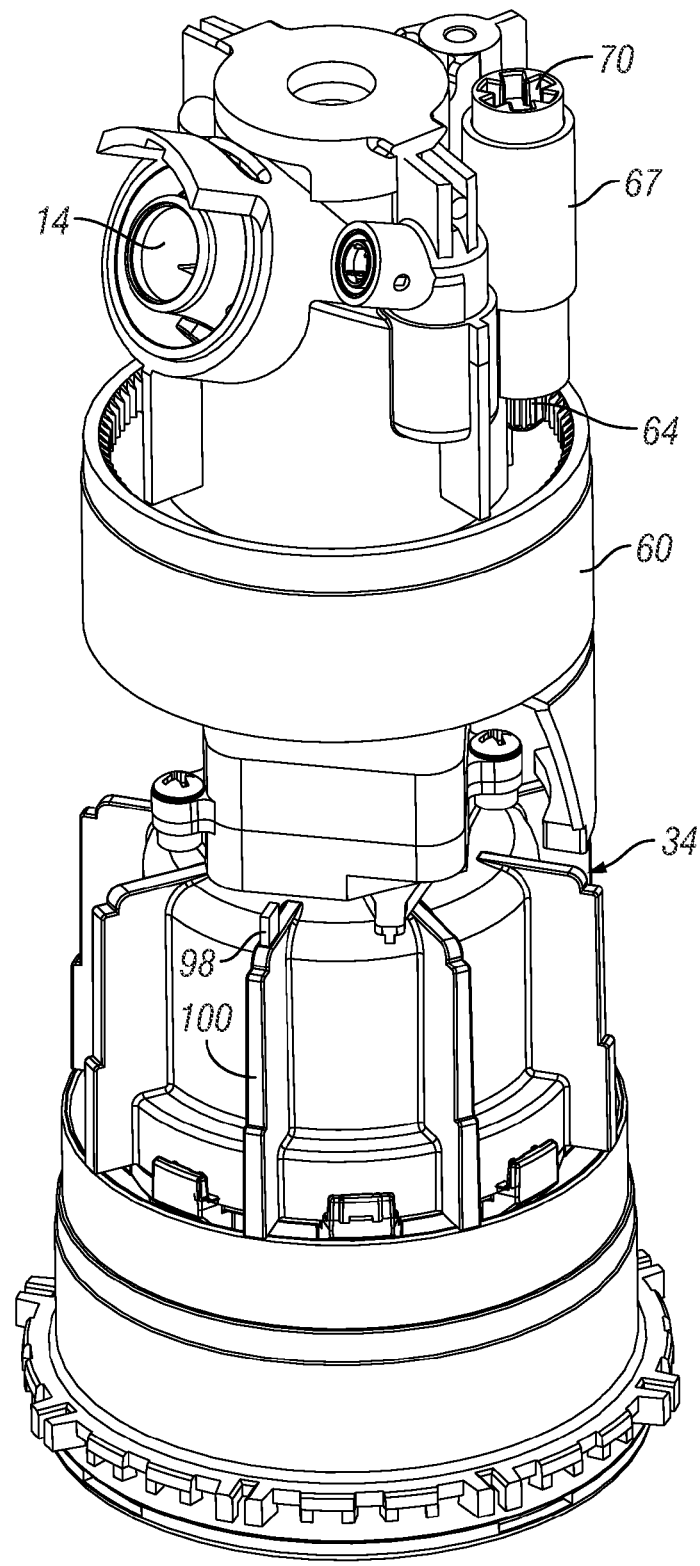
FIG. 12 is an isometric view of the assembled components illustrated in the exploded view of FIG. 3.

The fast spinning turbine 28 can slowly rotate the nozzle turret 26 through the reversing planetary gear drive 12 and the additional reversing mechanism 13. The additional reversing mechanism 13 includes cams and components that lift and drop the output shaft 46. An adjusting gear ring 60, carrier ring 62 and an adjusting gear 64 (FIG. 4) cooperate with the reversing mechanism 13 to permit user adjustment of the size of the arc of oscillation of the nozzle 14. The adjusting gear 64 is formed on the lower end of a shaft 66 that extends through a sleeve 67 (FIG. 12) formed in the turret 26. The shaft 66 extends through a coil spring 68 (FIG. 4). The coil spring 68 normally elevates adjusting gear 64 away from an inner toothed ring 102 during normal operation to allow the turret to rotate relative to the adjusting gear ring 60 during normal irrigation. The upper end 70 of the shaft 66 is formed with a socket that can be engaged with the end of a HUNTER® tool of the type illustrated in FIG. 8 of U.S. Pat. No. 6,042,021 of Michael L. Clark granted Mar. 28, 2000 and also assigned to Hunter Industries, Inc. The user can exert downward pressure on the shaft 66 with the adjusting tool to overcome the spring force and engage the adjusting gear 64 with the adjusting gear ring 60 to accomplish a fine adjustment to the arc of coverage of the sprinkler head. To provide quicker course adjustment of the arc of coverage, the installer can alternatively turn the adjusting gear ring 60 by hand providing a direct one to one adjustment of the arc of coverage.

Figure 6:
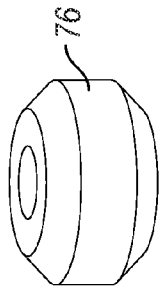
FIG. 6 is an enlarged isometric view of the shift member of the reversing mechanism illustrated in FIG. 5.
Figure 7:
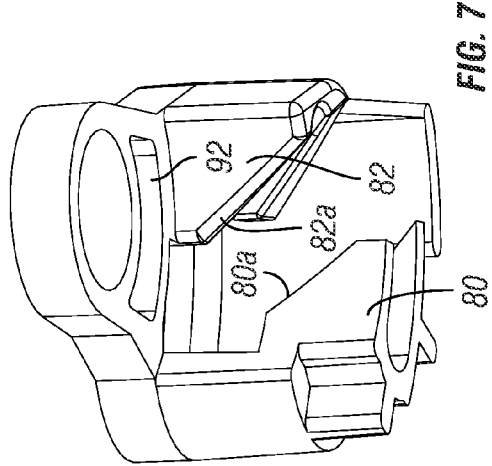
FIG. 7 is an enlarged isometric view of the shift fork of the reversing mechanism illustrated in FIG. 5.

The reversing mechanism 13 includes an upper shift housing 72 (FIG. 4) and a lower shift housing 74 that mate to form a complete housing with a hollow interior that encloses most of the other components of the reversing mechanism 13 hereafter described. The reversing mechanism 13 further includes a semi-spherical, i.e. barrel-shaped shift member 76 (FIGS. 5 and 6) that is rigidly secured to the upper end of the control shaft 46. The reversing mechanism 13 further includes a pivotable shift fork 78 (FIGS. 5 and 7) with first and second spaced apart cams 80 and 82. The first cam 80 is configured with a sloped surface 80a (FIG. 7) that raises the control shaft 46 when the shift fork 78 is pivoted to engage the first cam 80 with the shift member 76. The second cam 82 is configured with an oppositely sloped surface 82a that lowers the control shaft 46 when the shift fork 78 is pivoted to engage the second cam 82 with the shift member 76.

Figure 10:
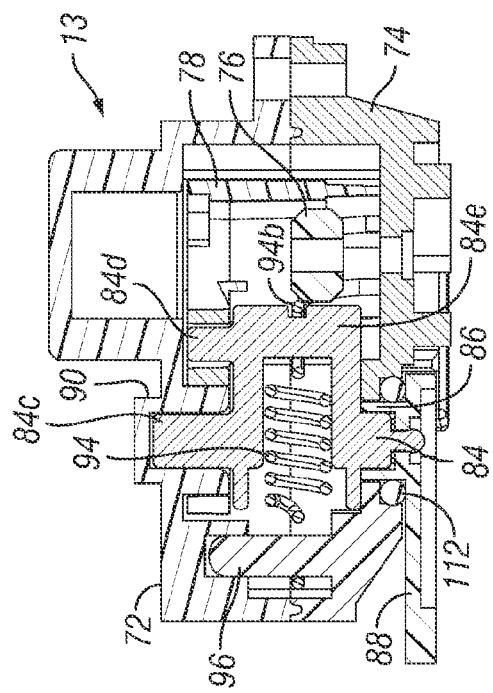
FIG. 10 is a vertical sectional view of the reversing mechanism taken along line 10-10 of FIG. 5 with the upper shift housing added.
Figure 11:
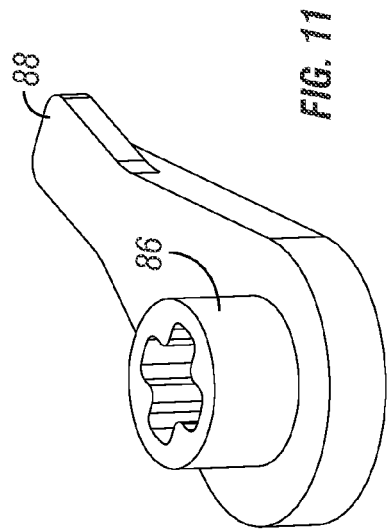
FIG. 11 is an enlarged isometric view of the shift toggle of the reversing mechanism of FIG. 5.
Figure 9:
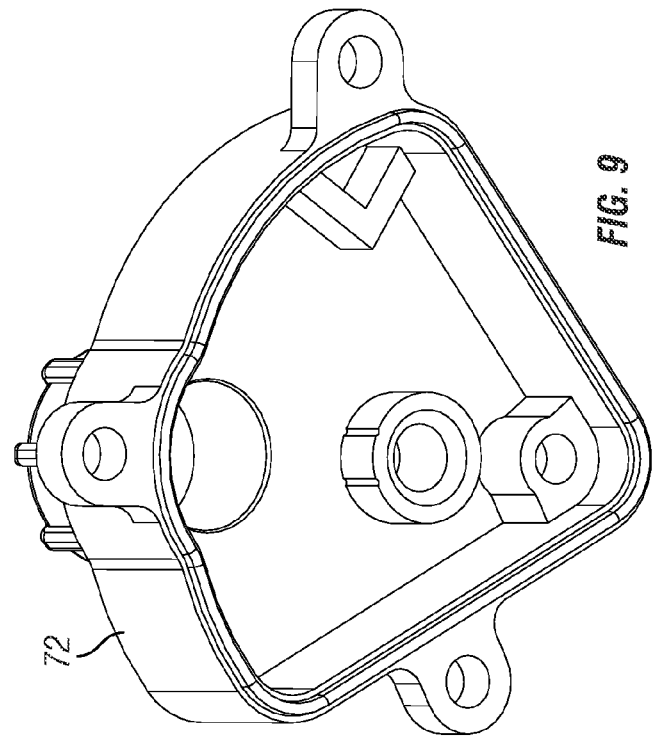
FIG. 9 is an enlarged isometric view of the upper shift housing of the reversing mechanism of FIG. 5.

The reversing mechanism 13 further includes a shift crank 84 (FIG. 8) that pivotally supports the shift fork 78 inside the joined upper and lower shift housings 72 and 74. The shift crank 84 has a lower spline shaft segment 84a with a rounded terminal portion 84b that are secured in a mating hub 86 (FIG. 10) formed on the inner end of a shift toggle 88 (FIG. 11). The spline shaft segment 84a interfaces with a mating opening in the hub 86 to rotationally lock them together so the movement of the shift toggle 88 directly forces the shifting movement of the shift crank 84. An O-ring 112 surrounds the hub 86. The shift crank 84 has an upper enlarged cylindrical segment 84c (FIG. 8) that is journaled in a cylindrical sleeve 90 (FIG. 10) formed in the upper shift housing 72. Another segment 84d (FIG. 8) of the shift crank 84 is loosely constrained inside a curved rectangular guide pocket 92 (FIGS. 5 and 7) formed in the shift fork 78 thereby effectively providing a lost motion linkage. An over-center coil spring 94 (FIG. 10) biases the shift fork 78 so that either the first cam 80 or the second cam 82 is engaged with the shift member 76. The over-center spring 94 has a first end 94a (FIG. 5) connected to a post 96 that extends from the lower shift housing 74 and a second end 94b (FIG. 10) connected to a central segment 84e of the shift crank 84.

Figure 5:
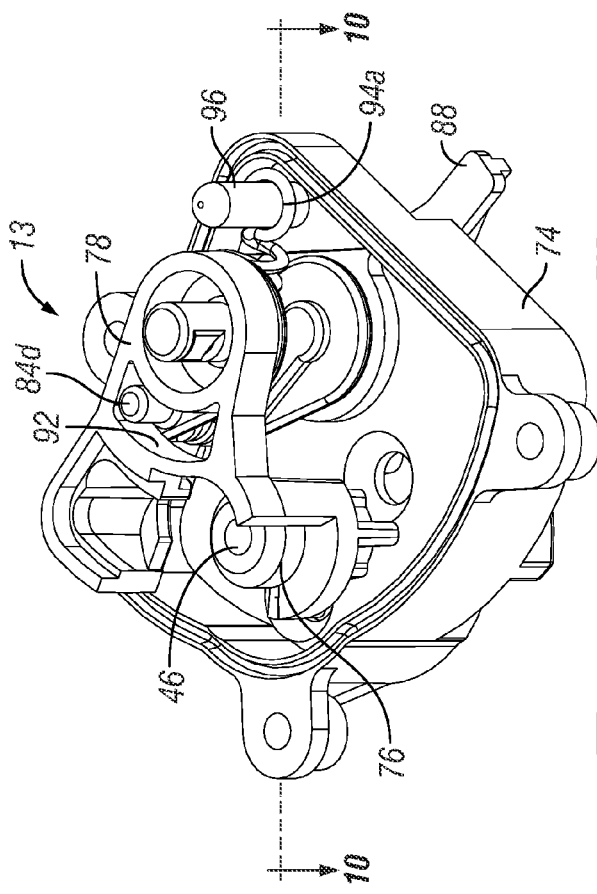
FIG. 5 is an enlarged isometric view of the reversing mechanism with its upper shift housing removed.
Figure 17:
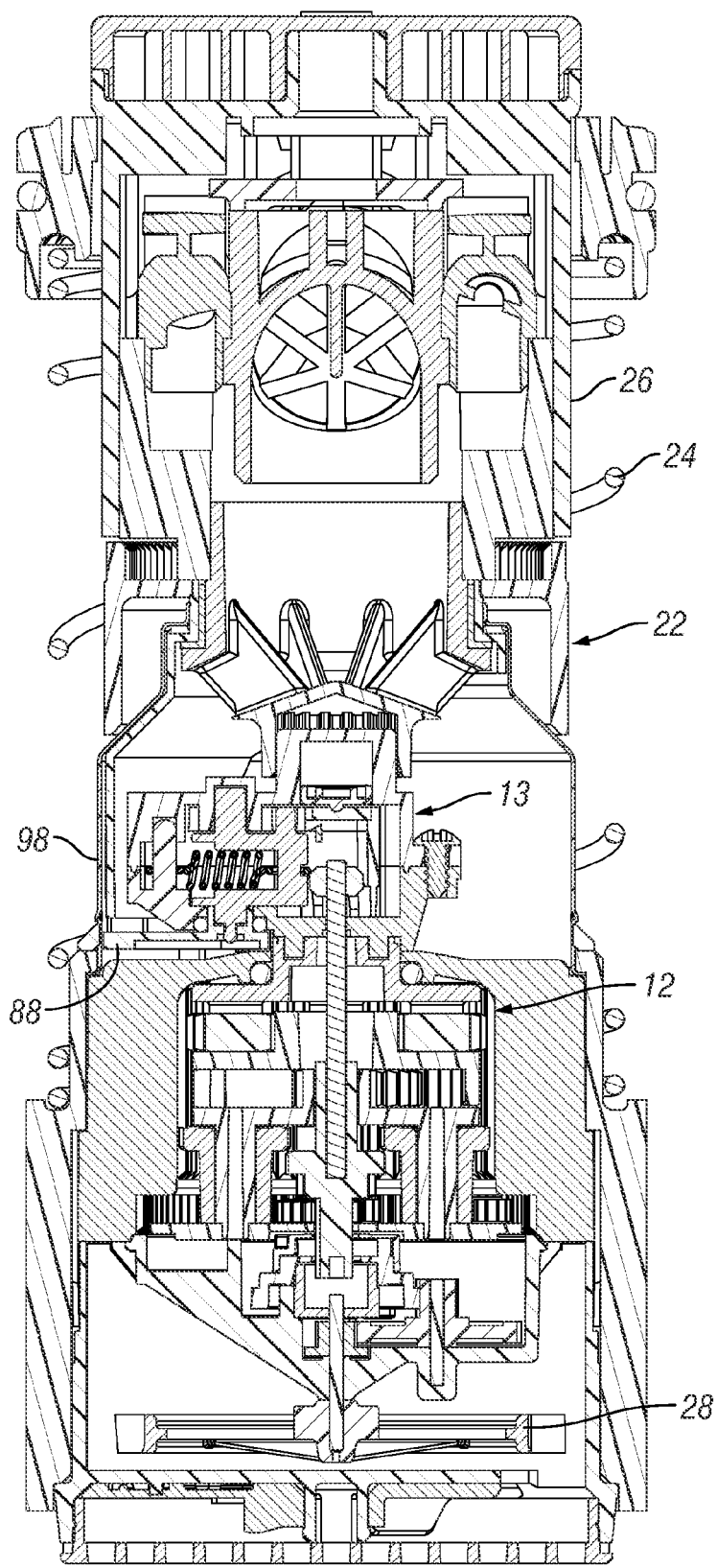
FIG. 17 is a vertical sectional view similar to FIG. 2 illustrating the fixed arc tab engaging the shift toggle of the reversing mechanism of FIG. 5.

The sprinkler 10 is designed to have its arc adjusted from the top side of the nozzle turret 26 as well as the outside diameter of the adjusting gear ring 60. A fixed arc tab 98 (FIG. 12) is integrally formed with one of the radial fins 100 of the cylindrical gear box housing 34 of the reversing planetary gear drive 12. The fixed arc tab 98 is positioned in a predetermined location so that the fixed arc tab 98 can be engaged by the outer end of the shift toggle 88 as the housing of the reversing mechanism 13 is rotated by the planetary gear drive 12 as illustrated in FIG. 17. The housing of the reversing mechanism is comprised of the upper and lower shift housings 72 and 74. When the outer end of the shift toggle 88 engages the fixed arc tab 98 it pivots the shift toggle 88, causing the shift fork 78 to pivot. As a result of the pivoting of the shift fork 78 the first cam 80 engages the shift member 76 as illustrated in FIG. 5. The first cam 80 axially lifts the shift member 76 and the control shaft 46 connected thereto, causing the bi-level shift sun gear 48 to move axially to its raised position inside the planetary gear drive illustrated in FIG. 13. This reverses the direction of rotation of the nozzle turret 26. The over-center spring 94 ensures positive motion of the shift fork 78 to one of its operative positions, preventing the shift fork from sticking in the middle of its range of motion where neither of the cams 80 and 82 is engaged with the shift member 76. This would undesirably cause the rotation of the nozzle turret 26 to stall, i.e. become stationary, or rotate in only one direction.

Figure 15:
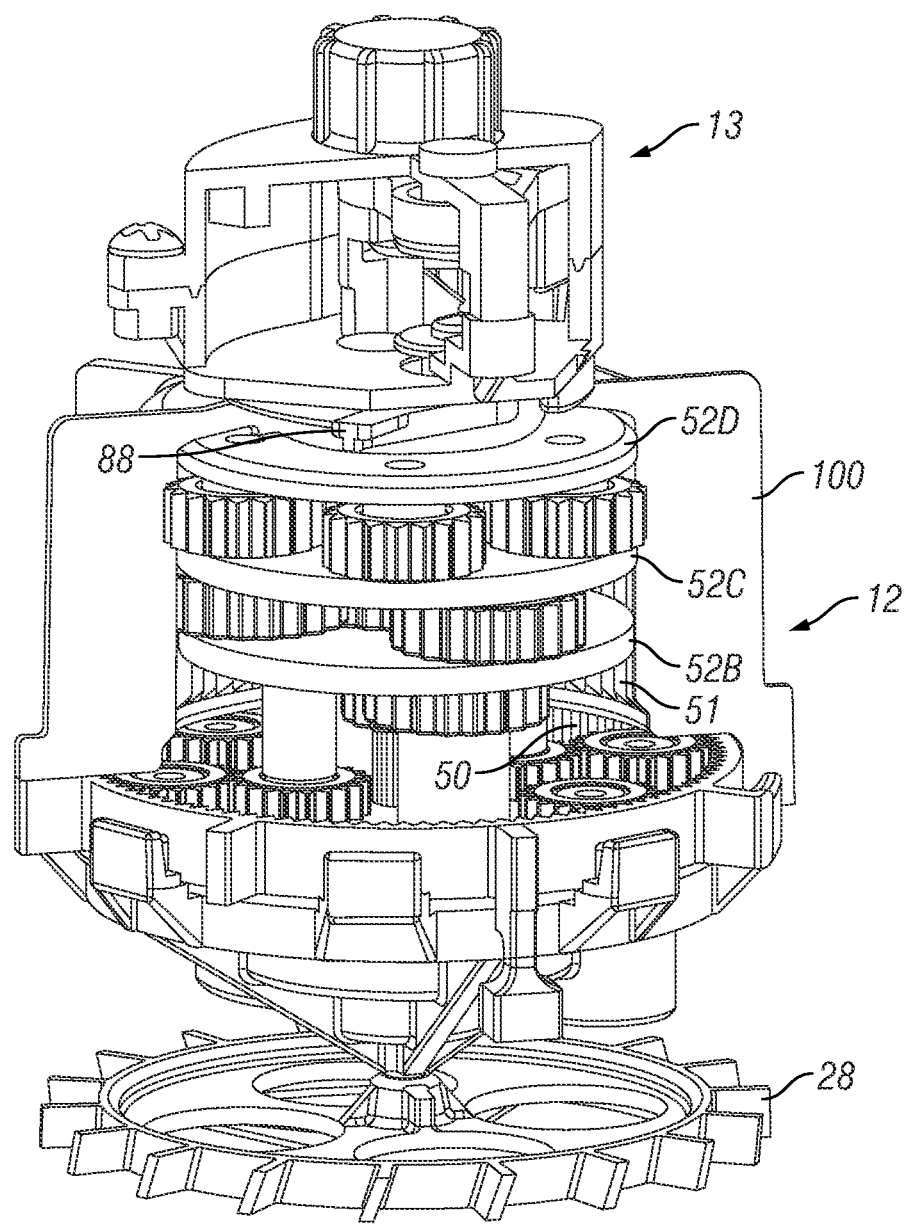
FIGS. 15 and 16 illustrate the two different configurations of the reversing planetary gear drive and reversing mechanism of the sprinkler of FIG. 1 that cause the nozzle turret to rotate in opposite directions.
Figure 16:
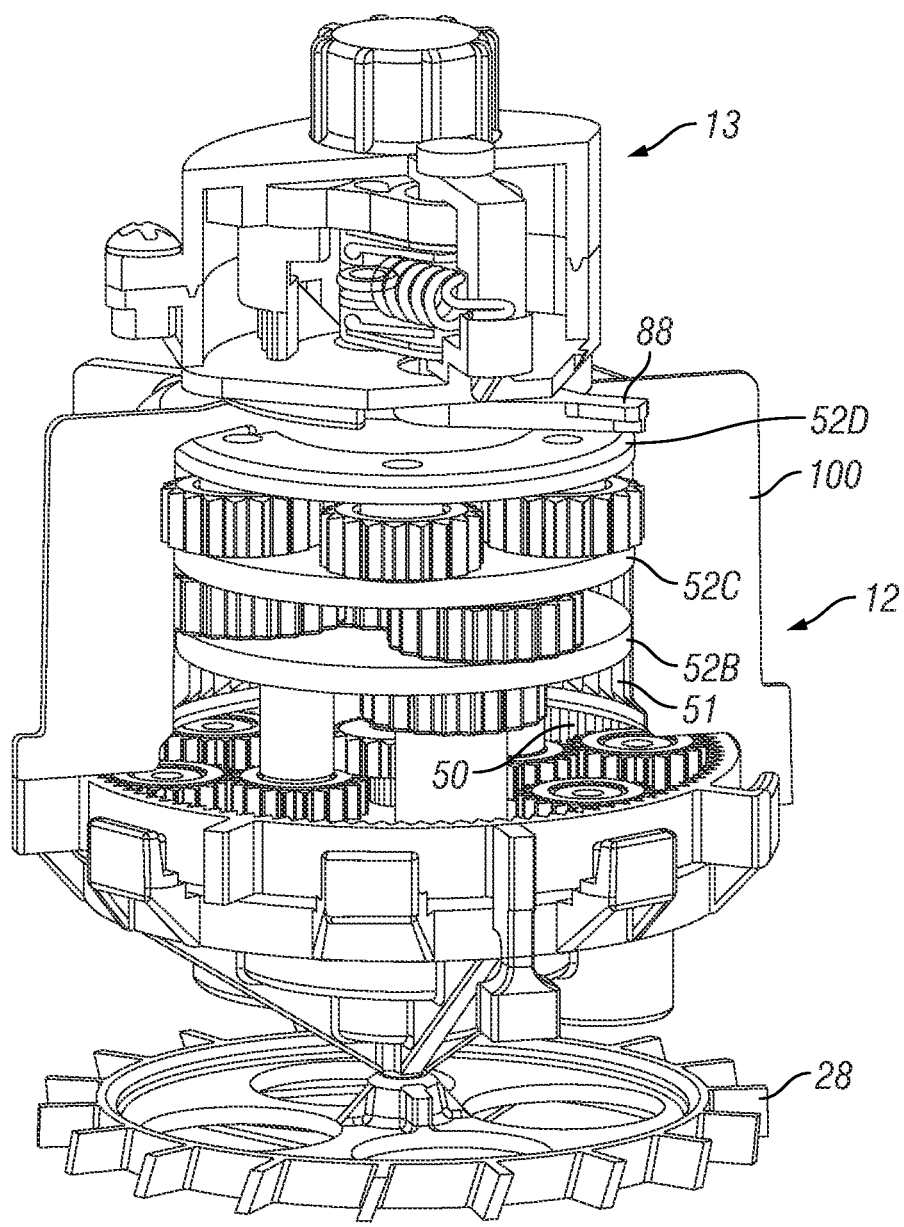
Figure 18:
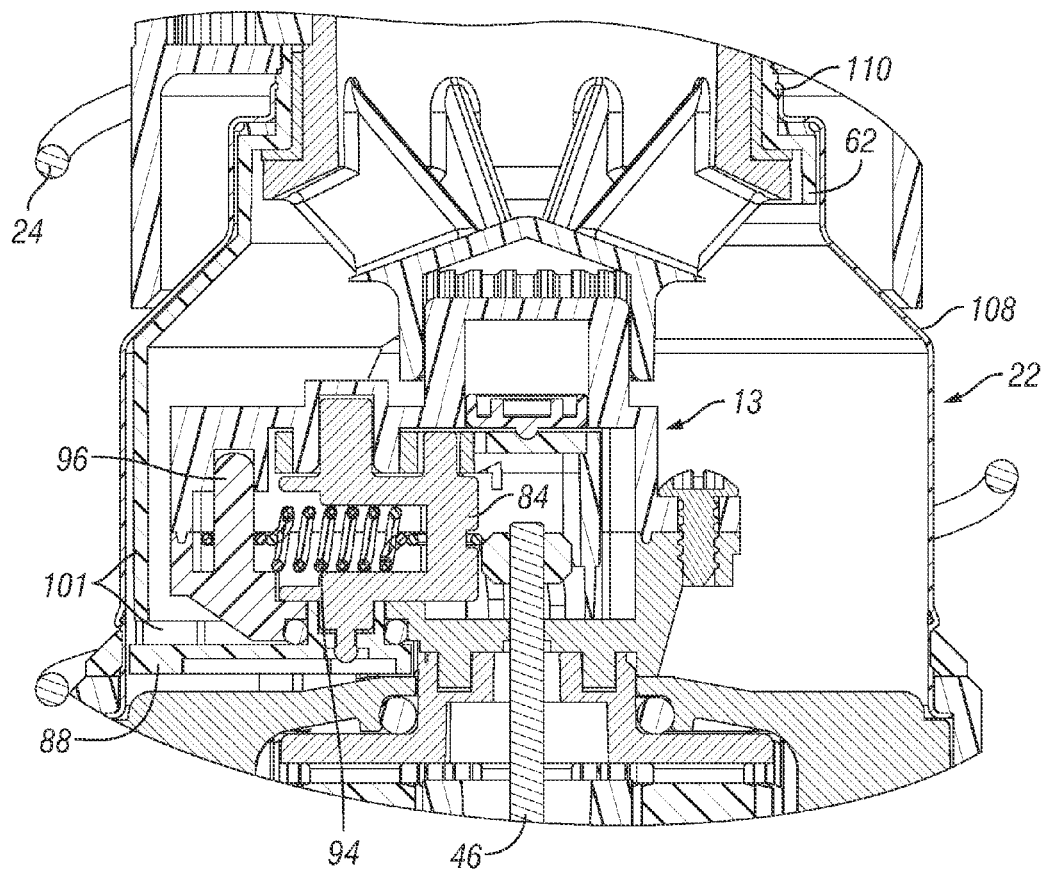
FIG. 18 is a fragmentary enlarged vertical sectional view of the riser of FIG. 2 taken from a different angle illustrating the adjustable arc tab engaging the shift toggle.

The carrier ring 62 (FIG. 4) is snap fit at joint 110 (FIG. 18) to the inside of a cylindrical stainless steel riser sleeve 108 and does not rotate during normal operation. The combination of materials and the snap fit allow the ring to rotate only when moved by hand or by turning with the adjusting gear 64. The adjusting gear ring 60 is coupled to the carrier ring 62 by engaging teeth 104 on adjusting ring gear 60 with the teeth 106 on the carrier ring 62. An adjustable arc tab 101 extends from the carrier ring 62 in a predetermined location so that the adjustable arc tab 101 can be engaged by the shift toggle 88 as the housing of the reversing mechanism 13 is rotated by the planetary gear drive 12. When the adjustable arc tab 101 engages the shift toggle 88 as illustrated in FIG. 18 the shift toggle 88 pivots. This in turn pivots the shift fork 78. This causes the second cam 82 to engage the shift member 76 and axially force the shift member 76 and the control shaft 46 connected thereto downwardly. This causes the bi-level shift sun gear 48 to move axially to its lowered position inside the planetary gear drive 12 illustrated in FIG. 14. This reverses the direction of rotation of the nozzle turret 26. The adjusting gear 64 (FIG. 4) can be turned by pressing down and rotating the shaft 66 inside the nozzle turret 26. The adjusting gear 64 has gear teeth that engage and mesh with complementary gear teeth 102 formed on the inside of the adjusting gear ring 60. Serrations 104 on the inner ring 60a of the adjusting gear ring 60 mate with complementary serrations 106 formed on a cylindrical projection 62a of the carrier ring 62 to lock the adjusting gear ring 60 and carrier ring 62 together. Rotation of the upper end 70 of the shaft 66 with the HUNTER tool thus permits a user to move the adjustable arc tab 101 to a predetermined circumferential location that precisely adjusts the size of the arc of oscillation of the nozzle 14. Alternatively, the user may rotate the adjusting ring gear 60 by gripping to the outside surface and rotating it to achieve a more course adjustment. The two different positions of the reversing planetary gear drive 12 and reversing mechanism 13 that cause the nozzle turret 26 to rotate in opposite directions are illustrated in FIGS. 15 and 16.

Only the circumferential position of the adjustable arc tab 101 (FIG. 4) can be changed by the user. The fixed arc tab 98 is fixed to the gear box housing 34 as it is a molded extension of one of its fins 100. When the sprinkler 10 is installed on a vertical riser connected to a subterranean pipe, the outer case 18 is rotated to set one arc limit, which is established by the location of the fixed arc tab 98. Alternately, this can be achieved by the user removing the riser and reinstalling it in the outer case 18 in a preferred rotational position. The adjusting ring gear 60 is then turned by hand to approximately set the other arc limit by moving the adjustable arc tab 101 to the correct circumferential position. The upper end 70 of the shaft 66 is then turned to make fine adjustment to the arc limit if desired.

Referring to FIG. 19, a sprinkler 210 can include reversing gear drive 212 operably connected to the turbine 28. The reversing gear drive 212 can be, for example, a reversing spur gear drive 212. The reversing gear drive 212 can be positioned between the turbine 28 and the reversing mechanism 13. The reversing gear drive 212 includes an input gear 248 (see, e.g., FIG. 20) rotatably connected to the turbine 28. For example, the input gear 248 can be rotatably connected to the upper spur gear 44. In some embodiments, the sprinkler 210 includes a clutch 37 configured to selectively rotationally disconnect the input gear from the upper spur gear 44. The input gear 248 can be spline-fit to the upper spur gear 44 and/or to the clutch 37 via a spline portion 249. The input gear 248 can translate or shift axially (e.g., parallel to the drive input 30 shaft) with respect to the upper spur gear 44 and/or with respect to the clutch 37. The input gear 248 can have a similar or identical connection to the reversing mechanism 13 as described above with respect to the shift sun gear 48. For example, the input gear 248 can be attached to a portion of the reversing mechanism 13 via a main control shaft 246.

Figure 20:
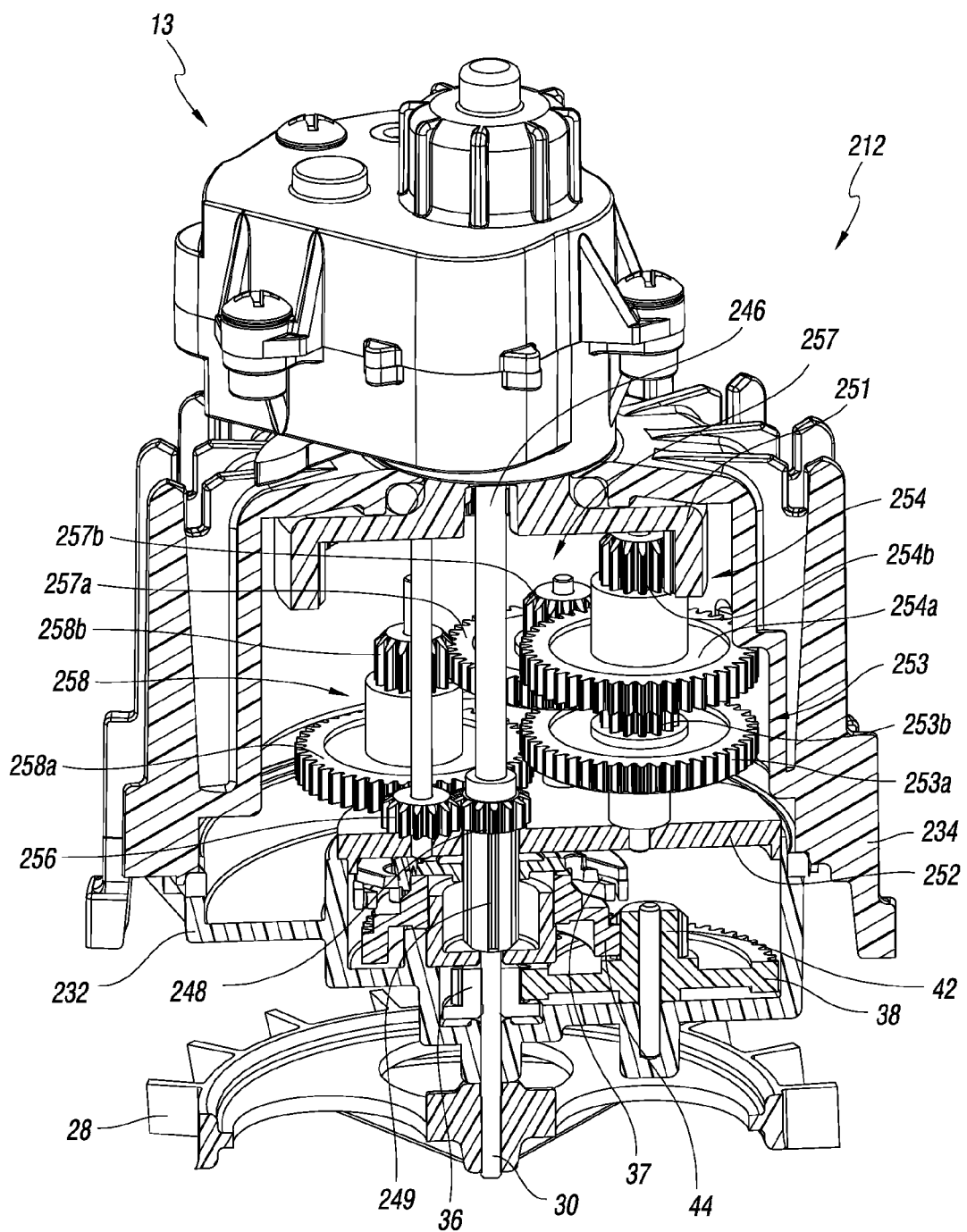
FIGS. 20 and 21 illustrate the reversing gear drive of the sprinkler of FIG. 19 in a forward operating configuration.
Figure 21:
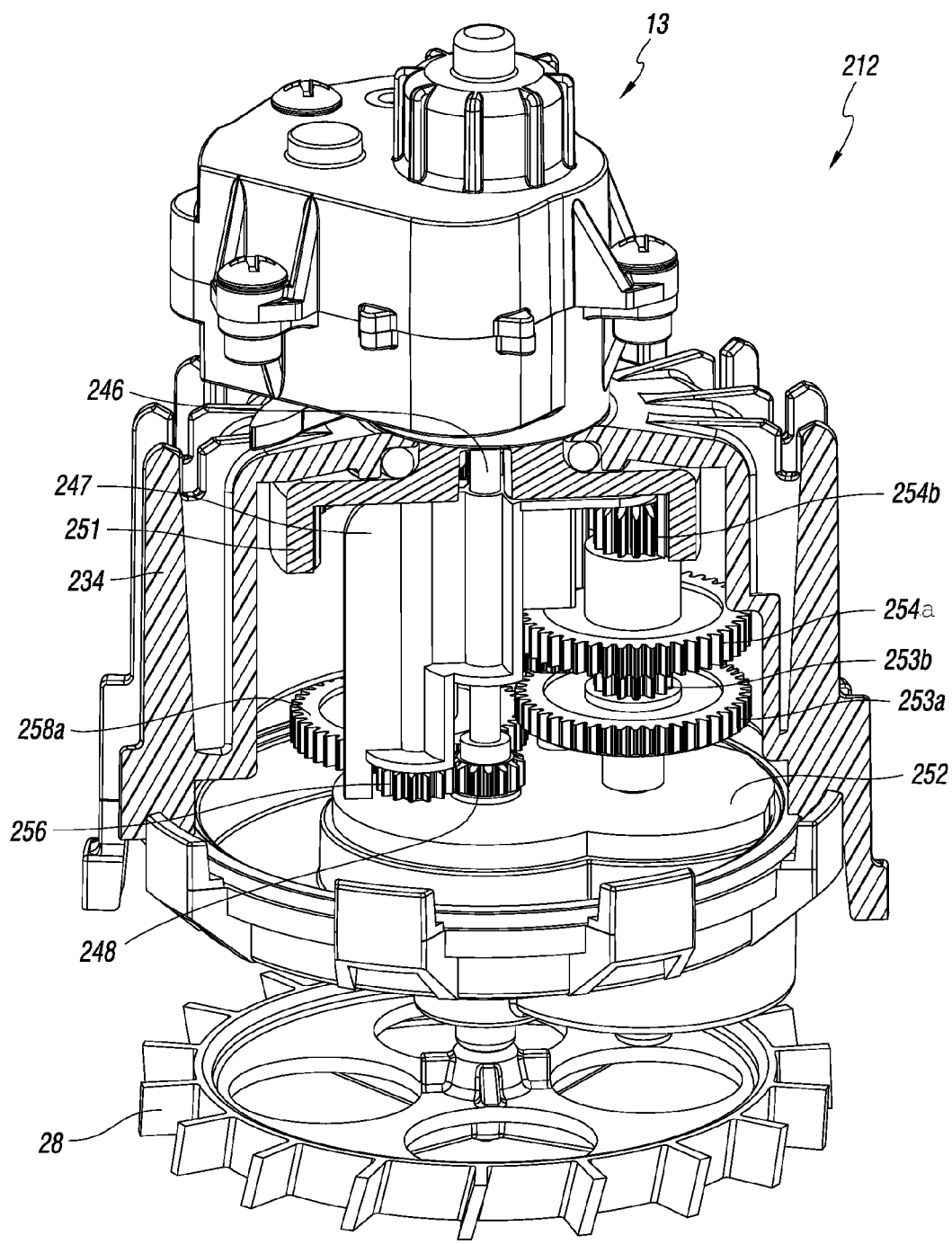

As illustrated in FIGS. 20 and 21, the reversing gear drive 212 can be positioned within a gear box housing 234. The gear box housing 234 includes a lower cap 232 defining a lower wall of the gear box housing 234. In some embodiments, the reversing gear drive 212 includes a gear stage carrier 252. The gear stage carrier 252 supports one or more of the gear stages within the reversing gear drive 212. For example, the gear stage carrier 252 can include one or more apertures configured to receive and/or support spline fittings, rotational shafts, non-rotational shafts, and/or other components of the reversing gear drive 212. In some embodiments, the reversing gear drive 212 includes a gear support 247 configured to brace and support the gear stages (e.g., the gear shafts) of the reversing gear drive 212.

FIGS. 20 and 21 illustrate the reversing gear drive 212 in a forward operating configuration (e.g., a configuration wherein the nozzle turret 26 is rotated in the same direction of rotation as the input gear 248). In the forward operating configuration, the input gear 248 meshes with an idler gear 256. The idler gear 256 and input gear 248 can have similar or identical diameters and/or the same number of gear teeth. The idler gear 256 engages with a first forward gear stage 258. The first forward gear state 258 engages with a second gear stage 257. The second gear stage 257 meshes and engages with a final gear stage 254. The final gear stage 254 meshes and engages with an output gear 251 (e.g., a ring gear). The output gear 251 rotationally engages with the reversing mechanism 13 (e.g., rotation of the output gear 251 rotates the reversing mechanism 13).

The first forward gear stage can include a first forward input gear 258a and a first forward output gear 258b. The first forward input gear 258a and/or the first forward output gear 258b can be spur gears. The idler gear 256 can mesh with the first forward input gear 258a. The first forward input gear 258a is rotationally coupled to (e.g., rotationally locked with) the first forward output gear 258b. For example, the first forward output gear 258b can be stacked with the first forward input gear 258a and rotationally locked thereto. In some embodiments, the first forward input gear 258a has a larger diameter and more teeth than the first forward output gear 258b.

In the illustrated embodiment, the first forward output gear 258b meshes with the second stage input gear 257a. The second stage input gear 257a is rotationally coupled to (e.g., rotationally locked with) to the second stage output gear 257b. For example, the second stage output gear 257b can be stacked with the second stage input gear 257a and rotationally locked thereto. The second stage input gear 257a and/or the second stage output gear 257b can be spur gears. In some embodiments, the second stage input gear 257a has a larger diameter and more teeth than the second stage output gear 257b.

The second stage output gear 257b is configured to mesh and engage with the final stage input gear 254a. The final stage input gear 254a is rotationally coupled to (e.g., rotationally locked with) to the final stage output gear 254b. For example, the final stage output gear 254b can be stacked with the final stage input gear 254a and rotationally locked thereto. In some embodiments, the final stage input gear 254a has a larger diameter and more teeth than the final stage output gear 254b. The final stage input gear 254a and/or the final stage output gear 254b can be spur gears. The final stage output gear 254b is configured to engage with the output gear 251. In the illustrated embodiment, the final stage output gear 254b is a spur gear and the output gear 251 is a ring gear.

Figure 22:
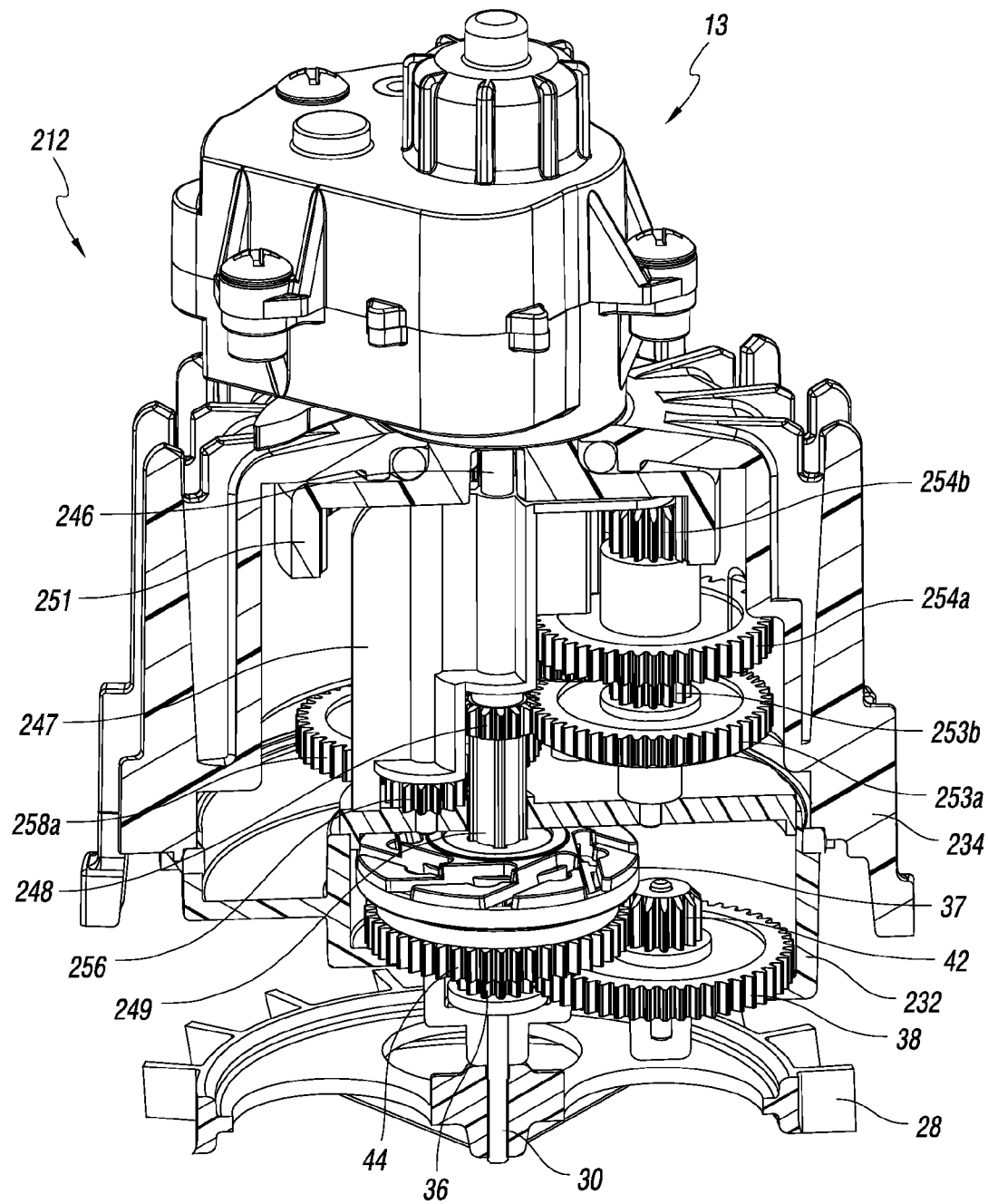
FIG. 22 illustrates the reversing gear drive of the sprinkler of FIG. 19 in a reverse operating configuration.

FIG. 22 illustrates the reversing gear drive 212 in a reverse operating configuration (e.g., a configuration in which the nozzle turret 26 is rotated in a direction opposite that of the input gear 248). For example, the input gear 248 can be shifted axially to engage with a first reversing gear stage 253. In some embodiments, upward shifting of the input gear 248 disengages the input gear 248 from the idler gear 256 and brings the input gear 248 into engagement with the first reversing gear stage 253. The first reversing gear stage 253 can engage with and rotate the second gear stage 257. The second gear stage 257 operates with the remaining gear stages (e.g., the final gear stage 254 and output gear 251) operate in substantially the same manner as discussed above with respect to the forward operating configuration. The first reversing gear stage 253 can include a first reversing input gear 253a and a first reversing output gear 253b. The first reversing input gear 253a and/or the first reversing output gear 253b can be spur gears. The input gear 248 can mesh with the first reversing input gear 253a. The first reversing input gear 253a is rotationally coupled to (e.g., rotationally locked with) the first reversing output gear 253b. For example, the first reversing output gear 253b can be stacked with the first reversing input gear 253a and rotationally locked thereto. In some embodiments, the first reversing input gear 253a has a larger diameter and more teeth than the first reversing output gear 253b.

While we have described and illustrated in detail embodiments of a sprinkler with a reversing gear drive, it should be understood that our invention can be modified in both arrangement and detail. For example, the sprinkler 10 could be modified to a simplified shrub configuration without the valve 16, outer case 18, valve actuator components 19 and housing 20. Therefore the protection afforded our invention should only be limited in accordance with the following claims.

What is claimed is:

1. A sprinkler comprising:
   a turbine;
   a nozzle; and
   a gear drive and reversing mechanism that rotatably couple the turbine and the nozzle, the gear drive including an axially movable control shaft configured to shift a direction of rotation of an output stage that is coupled to the reversing mechanism;
   wherein the reversing mechanism including a shift member secured to an upper end of the control shaft, and a pivotable shift fork with a first cam and a second cam spaced from the first cam, the first cam configured to engage the shift member and raise the control shaft when the shift fork is pivoted to engage the first cam with the shift member, and the second cam configured to engage the shift member and lower the control shaft when the shift fork is pivoted to engage the second cam with the shift member.

2. The sprinkler of claim 1, further comprising a riser enclosing the gear drive, an outer case surrounding the riser, and a coil spring surrounding the riser and normally holding the riser in a retracted position within the case and compressible to allow the riser to telescope to an extended position when pressurized water is introduced into the case.

3. The sprinkler of claim 2, wherein the nozzle is carried inside a nozzle turret rotatably mounted at the upper end of the riser.

4. The sprinkler of claim 1, wherein the reversing mechanism further includes a housing and a shift crank pivotally supporting the shift fork in the housing.

5. The sprinkler of claim 4, wherein the reversing mechanism further includes an over-center spring biasing the shift fork so that either the first cam or the second cam is engaged with the shift member.

6. The sprinkler of claim 5, wherein the over-center spring is a coil spring having a first end connected to the housing and a second end connected to the shift crank.

7. The sprinkler of claim 4, further comprising a shift toggle extending from the housing, the shift toggle being connected to the shift crank.

8. The sprinkler of claim 7, wherein the sprinkler further includes a fixed arc tab extending from a gear box housing of the gear drive in a predetermined location so that the fixed arc tab can be engaged by the shift toggle as the housing is rotated by the gear drive to pivot the shift fork to cause one of the first and second cams to engage the shift member.

9. The sprinkler of claim 7, wherein the sprinkler further comprises a nozzle turret carrying the nozzle, a carrier ring coupled to the nozzle turret and rotatable relative to the housing, a bull gear ring coupled to the carrier ring, and an adjustable arc tab extending from the carrier ring in a predetermined location so that the adjustable arc tab can be engaged by the shift toggle as the housing is rotated by the gear drive to pivot the shift fork to cause the other one of the first and second cams to engage the shift member.

10. A sprinkler, comprising:
    a nozzle:
    a gear drive with an output stage, a direction of rotation of the output stage being reversible by axial motion of a control shaft;
    a turbine coupled to an input stage of the gear drive; and
    a reversing mechanism coupled between the output stage of the gear drive and the nozzle, including a pair of cams that alternately engage a shift member connected to the control shaft.

11. The sprinkler of claim 10, wherein the drive member has a barrel shape.

12. The sprinkler of claim 10, wherein the cams are formed on a pivotable shift fork.

13. The sprinkler of claim 12, wherein the shift fork is pivotally mounted within a housing on a shift crank.

14. The sprinkler of claim 13, wherein the shift crank is pivotable by moving a shift toggle when it engages a pair of arc tabs.

15. The sprinkler of claim 14, further comprising an over-center spring connected between the housing and the shift crank.

16. The sprinkler of claim 10, wherein each cam has a sloped surface.

17. The sprinkler of claim 10, further comprising a nozzle turret that encloses the nozzle and is coupled to the reversing mechanism, the reversing mechanism partially mounted in the nozzle turret for moving an adjustable arc tab.

18. The sprinkler of claim 17, further comprising a fixed arc tab connected to a gear box of the gear drive.

19. A sprinkler comprising:
    a riser;
    a gear drive mounted inside the riser;
    a turbine coupled to an input shaft of the gear drive;
    a nozzle turret; and
    a reversing mechanism coupling an output stage of the gear drive and the nozzle turret that axially shifts a gear within the gear drive to change a direction of rotation of the output stage.

* * * * *